(12) United States Patent
Shimba

(10) Patent No.: US 11,516,009 B2
(45) Date of Patent: Nov. 29, 2022

(54) DATA COLLECTING SYSTEM, DATA COLLECTING APPARATUS, AND NON-TRANSITORY COMPUTER READABLE MEDIUM

(71) Applicant: FUJIFILM Business Innovation Corp., Tokyo (JP)

(72) Inventor: Hiroaki Shimba, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 449 days.

(21) Appl. No.: 16/559,652

(22) Filed: Sep. 4, 2019

(65) Prior Publication Data
US 2020/0304296 A1    Sep. 24, 2020

(30) Foreign Application Priority Data
Mar. 18, 2019 (JP) .............................. JP2019-050358

(51) Int. Cl.
*H04L 9/08* (2006.01)
*H04W 84/18* (2009.01)
*H04L 67/56* (2022.01)

(52) U.S. Cl.
CPC ............ *H04L 9/088* (2013.01); *H04L 9/0819* (2013.01); *H04L 67/56* (2022.05); *H04W 84/18* (2013.01)

(58) Field of Classification Search
CPC ....... H04L 9/088; H04L 9/0819; H04L 67/28; H04L 67/125; H04L 67/2838; H04W 84/18
USPC ........................................................ 713/168
See application file for complete search history.

(56) References Cited

U.S. PATENT DOCUMENTS

| | | | |
|---|---|---|---|
| 10,157,290 B1* | 12/2018 | Sinha | H04L 63/1408 |
| 10,579,816 B2* | 3/2020 | Malik | G06F 21/6218 |
| 2014/0279397 A1* | 9/2014 | Schmidt | G06Q 40/025 |
| | | | 705/38 |
| 2019/0018852 A1* | 1/2019 | Ohishi | G06F 16/122 |
| 2020/0145384 A1* | 5/2020 | Chauhan | G06F 16/95 |
| 2022/0038441 A1* | 2/2022 | Chauhan | H04L 67/2823 |

FOREIGN PATENT DOCUMENTS

| | | |
|---|---|---|
| JP | 2010-020397 | 1/2010 |
| JP | 2016072769 | 5/2016 |
| WO | 2016051615 | 4/2016 |

* cited by examiner

*Primary Examiner* — Sanchit K Sarker
(74) *Attorney, Agent, or Firm* — JCIPRNET

(57) ABSTRACT

A data collecting system includes a central server and at least one edge server capable of bi-directionally communicating with the central server. The edge server includes a collecting unit that collects data generated by a group of devices, and an output processing unit that encrypts the collected data and transmits the encrypted data to the central server. The encryption of the collected data is performed in accordance with an encryption policy that defines encryption schemes for different combinations of a device type and a data type.

13 Claims, 14 Drawing Sheets

| SECURITY LEVEL | ENCRYPTION SCHEME |
|---|---|
| HIGH | AES256 |
| MIDDLE | AES128 |
| LOW | RC4 |

| DEVICE TYPE | DATA TYPE | SECURITY LEVEL |
|---|---|---|
| MODELS A, B, C | INTERACTION | HIGH |
| MODEL D | BIOLOGICAL | MIDDLE |
| MODELS A, B, D | POSITION | MIDDLE |
| MODELS E, F, G, H | DEVICE OPERATION | LOW |
| MODEL H | SYSTEM OPERATION | HIGH |

FIG. 11A
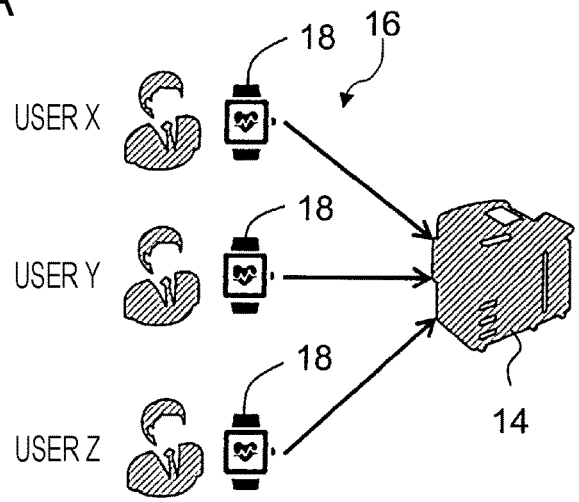
FIG. 11B
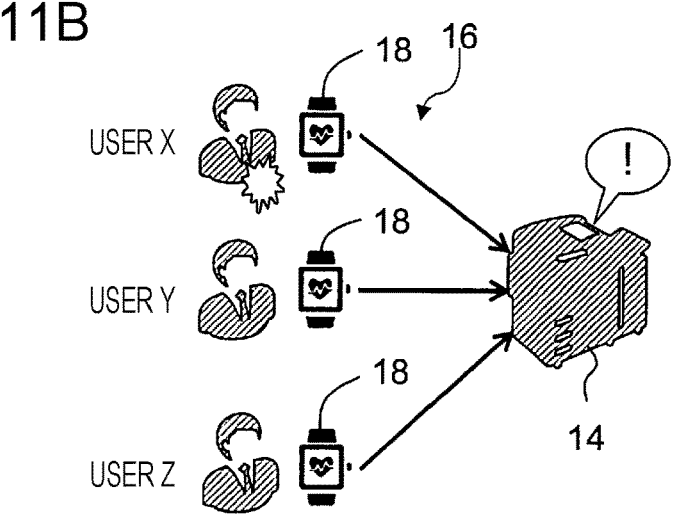
FIG. 11C
| DEVICE TYPE | DATA TYPE | SECURITY LEVEL |
|---|---|---|
| MODELS A, B, C | INTERACTION | HIGH |
| MODEL D | BIOLOGICAL | MIDDLE → HIGH |
| MODELS A, B, D | POSITION | MIDDLE |
| MODELS E, F, G, H | DEVICE OPERATION | LOW |
| MODEL H | SYSTEM OPERATION | HIGH |
78b FIG. 12A
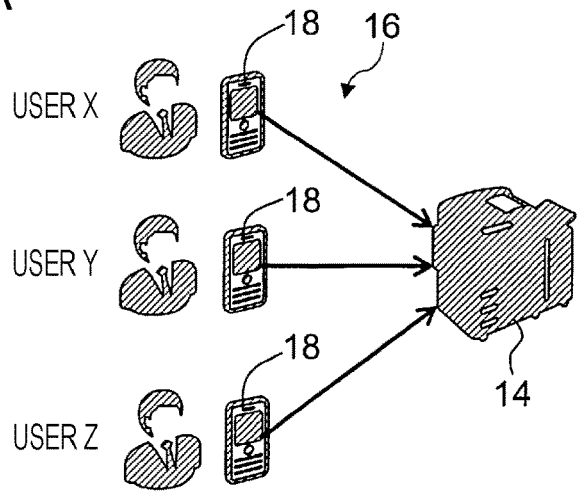
FIG. 12B
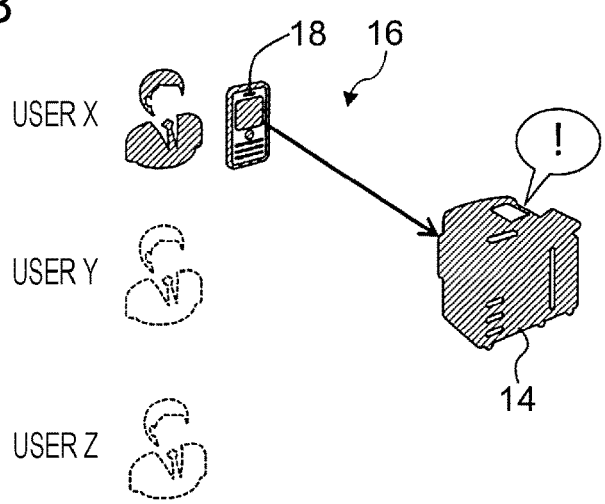
FIG. 12C
| DEVICE TYPE | DATA TYPE | SECURITY LEVEL |
|---|---|---|
| MODELS A, B, C | INTERACTION | HIGH |
| MODEL D | BIOLOGICAL | MIDDLE |
| MODELS A, B, D | POSITION | MIDDLE → HIGH |
| MODELS E, F, G, H | DEVICE OPERATION | LOW |
| MODEL H | SYSTEM OPERATION | HIGH |

DATA COLLECTING SYSTEM, DATA COLLECTING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-050358 filed Mar. 18, 2019.

BACKGROUND

(i) Technical Field

The present disclosure relates to a data collecting system, a data collecting apparatus, and a non-transitory computer readable medium.

(ii) Related Art

Japanese Unexamined Patent Application Publication No. 2010-020397 discloses an information processing apparatus that determines the security levels of print data and storage servers and decides on a storage server to which the print data is to be transmitted. It is described therein that, for example, the apparatus determines the security level of print data in accordance with whether or not the print data includes text indicating confidentiality.

Japanese Unexamined Patent Application Publication No. 2016-072769 discloses a data management system including a management server that performs user authentication. It is described therein that, for example, the management server determines a security level by using information indicating the position of a client terminal in accordance with a predetermined policy and transmits an encryption key corresponding to the security level to the client terminal.

SUMMARY

In an "edge computing system" in which servers are located in a distributed manner near terminal devices (hereinafter simply referred to as "devices"), it is necessary to take security measures for communication between an edge server and a central server. For example, under the consideration that each device generates data with a predetermined format or definition based on a functional request, operation is assumed in which the edge server dynamically decides on an encryption scheme for the data in accordance with the type of device.

However, in the above operation, even when collectable data is changed as a result of change in the functions of the devices (for example, addition, deletion, change in data specifications, or the like), the encryption scheme for the data is uniformly decided on according to the type of device. This leads to a possibility that the edge server will encrypt and transmit data with partial mismatch in security level. In particular, in an Internet of Things (IoT) system in which various devices are connected to the Internet, data is collected from many types of devices, and thus the above-mentioned mismatch occurs frequently.

Aspects of non-limiting embodiments of the present disclosure relate to a technique for reducing mismatch in security level caused by change in functions of devices when encrypting data collected from the devices, compared to a case where an encryption scheme is decided on according to only the type of device.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a data collecting system including a central server and at least one edge server capable of bi-directionally communicating with the central server. The edge server includes a collecting unit that collects data generated by a group of devices, and an output processing unit that encrypts the collected data and transmits the encrypted data to the central server. The encryption of the collected data is performed in accordance with an encryption policy that defines encryption schemes for different combinations of a device type and a data type.

BRIEF DESCRIPTION OF THE DRAWINGS

An exemplary embodiment of the present disclosure will be described in detail based on the following figures, wherein:

FIGS. 5A and 5B illustrate an example of the data structure of an encryption policy in FIG. 4;

FIGS. 11A to 11C illustrate a first change example of the encryption policy;

FIGS. 12A to 12C illustrate a second change example of the encryption policy;

DETAILED DESCRIPTION

A data collecting system according to an exemplary embodiment of the present disclosure will be described with reference to the attached drawings, together with an exemplary embodiment of the relationship with a data collecting apparatus and a non-transitory computer readable medium storing a data collection program. Obviously, the present disclosure is not limited to the following exemplary embodiment and can be freely changed without deviating from the gist of the present disclosure. Alternatively, individual configurations may be arbitrarily combined without causing technical inconsistency.

Configuration of Data Collecting System 10

Overall Configuration

Figure 1:
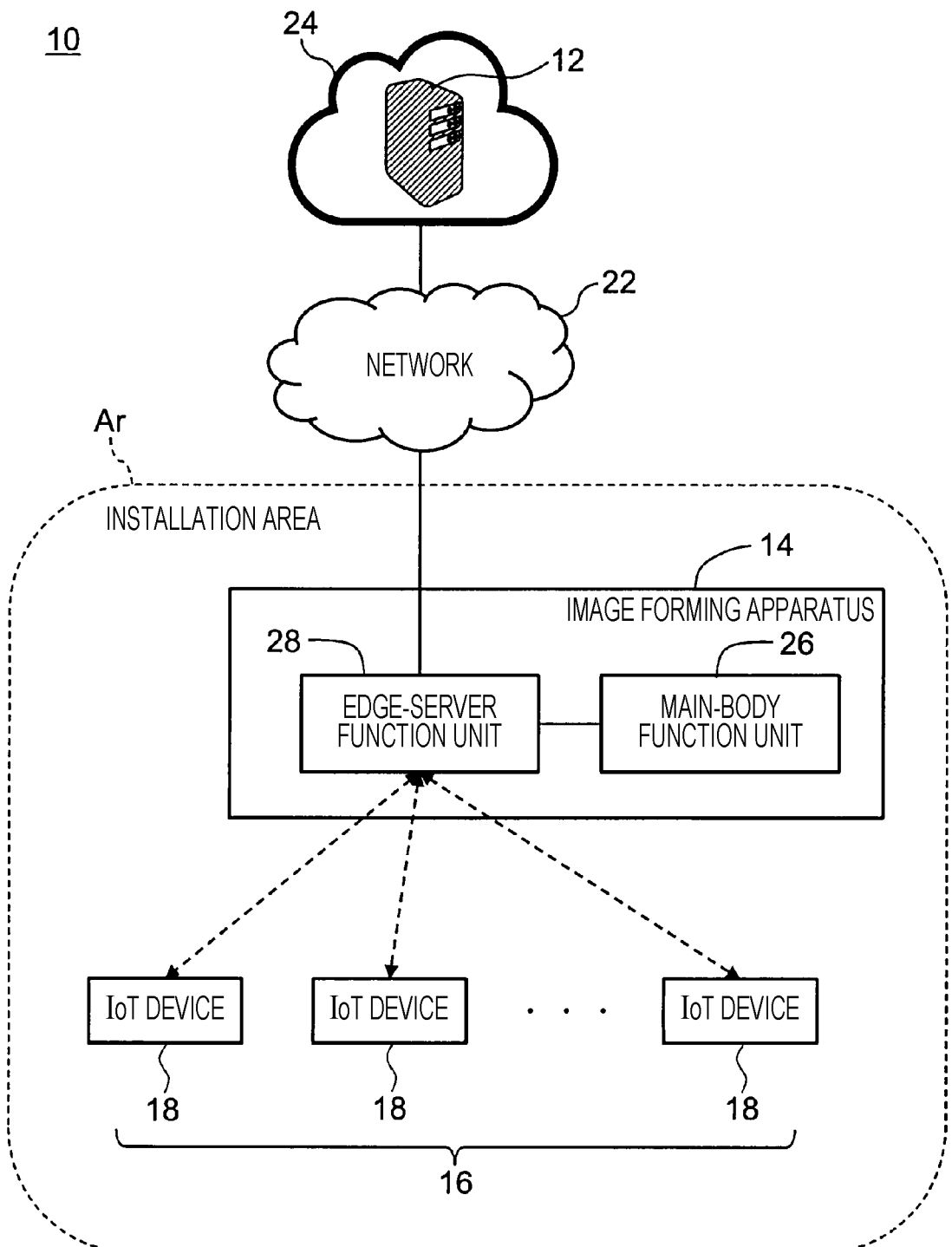
FIG. 1 illustrates an overall configuration of a data collecting system according to an exemplary embodiment of the present disclosure.

FIG. 1 illustrates an overall configuration of a data collecting system 10 according to an exemplary embodiment of the present disclosure. The data collecting system 10 is capable of providing both an "image formation service" for providing a formed image to a user in an installation area Ar and a "data collection service" for collecting and analyzing data that is sequentially generated in the installation area Ar.

Specifically, the data collecting system 10 includes a central server 12, an image forming apparatus 14 serving as an edge server (or a data collecting apparatus), and a device group 16 formed of plural Internet of Things (IoT) devices 18. The image forming apparatus 14 and the device group 16 are provided in the installation area Ar, such as an office. The image forming apparatus 14 is capable of bi-directionally communicating with the central server 12 through a network 22. Although FIG. 1 illustrates only one image forming apparatus 14, plural image forming apparatuses 14 may be provided in one installation area Ar. In addition, although FIG. 1 illustrates only one installation area Ar, there may be an installation area different from the installation area Ar.

The central server 12 is constituted by one or plural server computers located on a cloud 24. The central server 12 collects data from the image forming apparatus 14 serving as an edge server and performs various processing operations to utilize the data. The central server 12 may be a cloud server or an on-premises server.

The image forming apparatus 14 is a digital multifunction machine (a so-called multifunction printer (MFP)) that executes at least one of a printer function, a copy function, a scan function, a facsimile function, and a data transmission function. The image forming apparatus 14 includes a main-body function unit 26 having a function mainly related to the "image formation service" and an edge-server function unit 28 having a function mainly related to the "data collection service".

The configuration of the edge server is not limited to the configuration including the edge-server function unit 28 in addition to the image forming apparatus 14. For example, the edge-server function unit 28 may be mounted in an apparatus of various types including a main-body function unit different from that of the image forming apparatus 14. Alternatively, the edge server may be formed of a dedicated apparatus having only an edge-server function.

Each IoT device 18 has a generation function of generating data by using various functions equipped in the device, and a communication function of transmitting the generated data to the outside through wired or wireless communication. The IoT device 18 may be a stationary device in the installation area Ar (for example, a computer device, a communication device, an office device, a lighting device, an air conditioning device, a measuring device, or the like), or may be a portable device that can be carried into the installation area Ar (for example, a laptop, a tablet, a smartphone, a wearable device, or the like). In addition, the image forming apparatus 14 including the main-body function unit 26 may be regarded as an IoT device 18.

Figure 2:
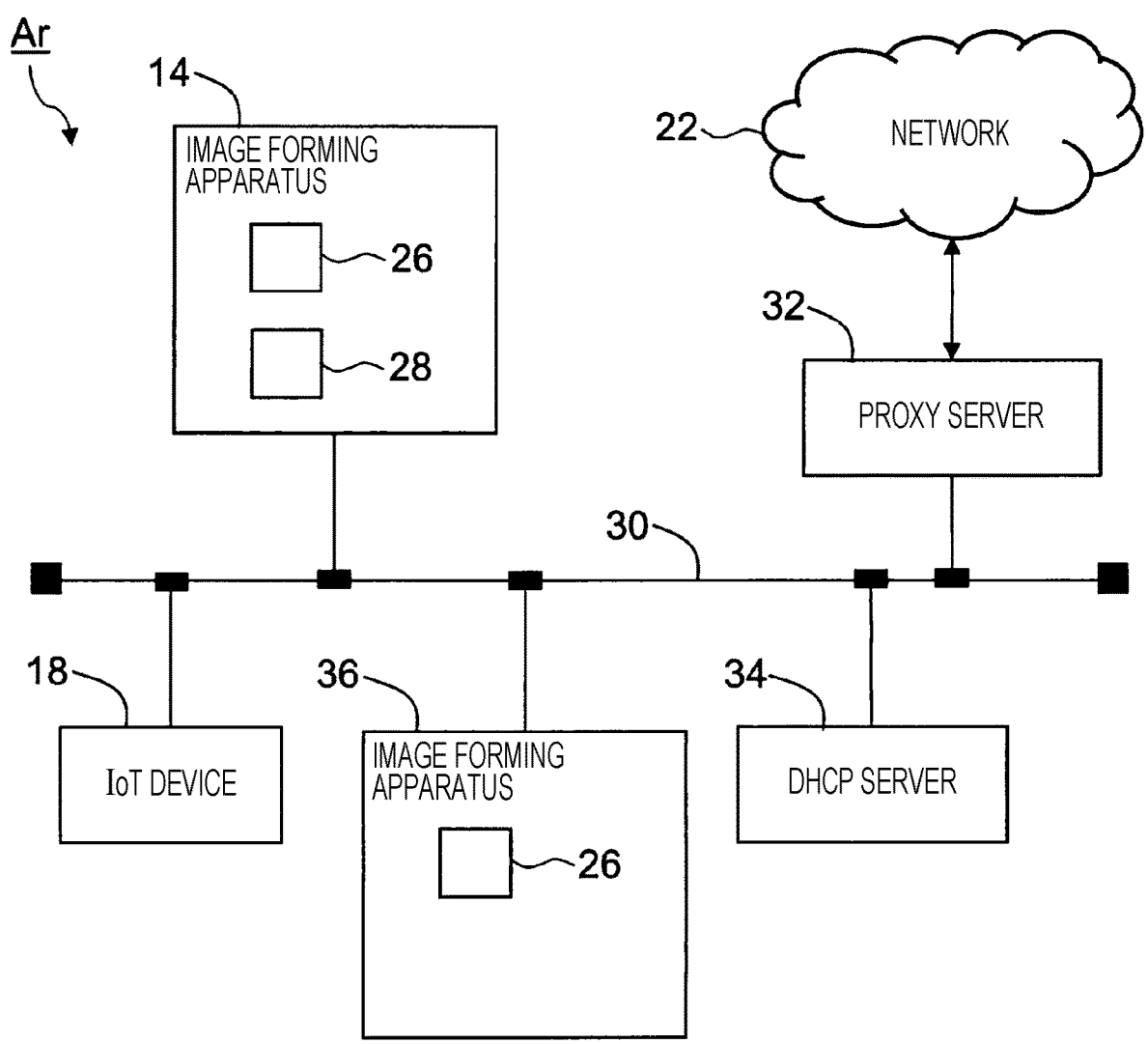
FIG. 2 illustrates a network configuration in an installation area illustrated in FIG. 1.

FIG. 2 illustrates a network configuration in the installation area Ar illustrated in FIG. 1. In the installation area Ar, a narrow-band network (hereinafter referred to as a LAN 30) is established. The image forming apparatus 14, the IoT device 18, a proxy server 32, a dynamic host configuration protocol (DHCP) server 34, and an image forming apparatus 36 are connected to the LAN 30.

The proxy server 32 communicates with an external apparatus, including the central server 12, by acting as an intermediary for various devices connected to the LAN 30. The DHCP server 34 performs setting and management of network information for the devices connected to the LAN 30. The configuration of the image forming apparatus 36 is different from that of the image forming apparatus 14 in terms of not including the edge-server function unit 28.

Electrical Block Diagram of Image Forming Apparatus 14

Figure 3:
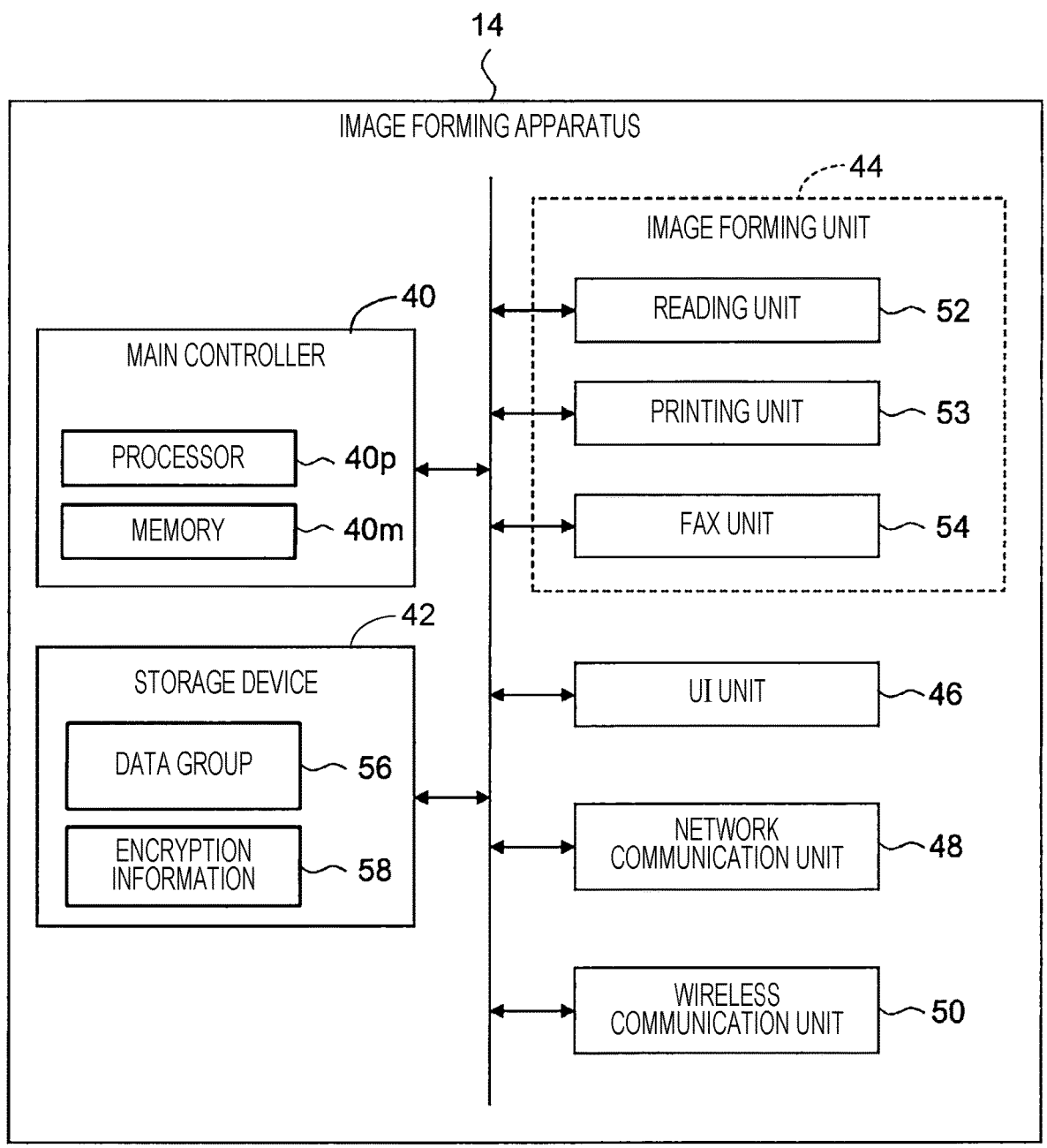
FIG. 3 is an electrical block diagram of an image forming apparatus illustrated in FIGS. 1 and 2.

FIG. 3 is an electrical block diagram of the image forming apparatus 14 illustrated in FIGS. 1 and 2. The image forming apparatus 14 includes a main controller 40, a storage device 42, an image forming unit 44, a user interface unit (hereinafter referred to as a UI unit) 46, a network communication unit 48, and a wireless communication unit 50.

The image forming unit 44 includes a reading unit 52 that reads information on a sheet and generates image data, a printing unit 53 that outputs a printed material on the basis of the image data, and a FAX unit 54 that performs transmission and reception by facsimile. The UI unit 46 is formed of, for example, a touch screen display and hardware buttons and receives an input operation performed by a user.

The network communication unit 48 is a communication module for performing network communication with an external apparatus, including the central server 12. The wireless communication unit 50 is a communication module for performing wireless communication with an external apparatus, including the IoT device 18. The "wireless communication" includes not only wireless communication in a narrow sense using radio waves but also spatial light communication using spatial light (specifically, infrared communication or visible light communication).

The main controller 40 includes a processor $40p$ and a memory $40m$ and centrally controls the individual units constituting the image forming apparatus 14. The processor $40p$ is an arithmetic processing device including a central processing unit (CPU) and a micro-processing unit (MPU). The memory $40m$ is a non-transitory computer readable storage medium.

The storage device 42 is formed of, for example, a hard disk drive (HDD) or a solid state drive (SSD) and stores various data handled by the image forming apparatus 14. In the example illustrated in FIG. 3, the storage device 42 stores a data group 56 and encryption information 58, both of which will be described below.

Functional Block Diagram of Main Controller 40

Figure 4:
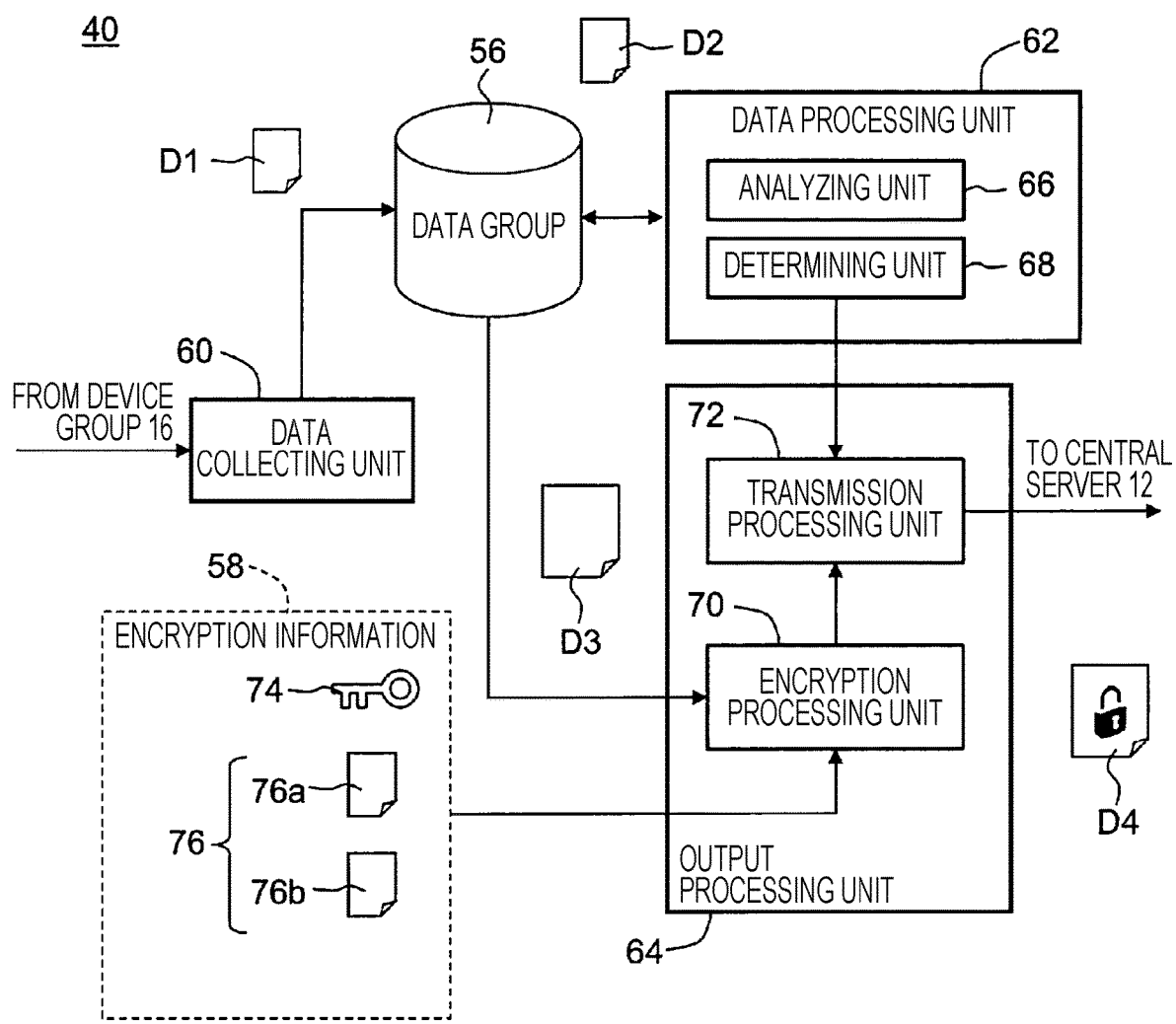
FIG. 4 is a functional block diagram of a main controller illustrated in FIG. 3.

FIG. 4 is a functional block diagram of the main controller 40 illustrated in FIG. 3. The processor $40p$ of the main controller 40 reads a program related to the data collection service from the memory $40m$ and executes the program, thereby functioning as a data collecting unit 60 (corresponding to a "collecting unit"), a data processing unit 62, and an output processing unit 64 (corresponding to an "output processing unit").

The data collecting unit 60 collects data generated by the device group 16 (hereinafter also referred to as "first data D1") and causes the storage device 42 (FIG. 3) to temporarily store the first data D1 in association with specific information about the IoT devices 18 (hereinafter referred to as device information). The "device information" enables the IoT devices 18 to be identified or classified and may be, for example, product model numbers, MAC addresses, or DHCP option 60 (that is, vendor class IDs).

The data processing unit 62 performs desired data processing on the first data D1. Specifically, the data processing unit 62 includes an analyzing unit 66 that analyzes the first data D1 to generate second data D2 and a determining unit 68 (corresponding to a "determining unit") that determines whether or not the first data D1 satisfies a specific condition.

The output processing unit 64 performs desired output processing on the first data D1 or second data D2 (hereinafter also referred to as "provided data D3") included in the data group 56 and outputs the resulting data to the central server 12. Specifically, the output processing unit 64 includes an encryption processing unit 70 that encrypts data by using the encryption information 58 and a transmission processing unit 72 that transmits the data via the network communication unit 48.

The encryption information 58 includes at least one encryption key 74 and an encryption policy 76 for deciding on an encryption scheme. The encryption key 74 is a secret key shared with the central server 12 (FIG. 1) and is used to encrypt or decrypt data.

FIGS. 5A and 5B illustrate an example of the data structure of the encryption policy 76 in FIG. 4. In the example illustrated in FIGS. 5A and 5B, the encryption policy 76 is formed of a combination of two types of policy information. Alternatively, the encryption policy 76 may have another data structure.

FIG. 5A illustrates an example of the data structure of first policy information 76a. The first policy information 76a is formed of a data table indicating the correspondences between security levels and encryption schemes for data. Here, the "security level" means the level of security required for transmitting data, and is defined by plural levels (in the example illustrated in FIG. 5A, three levels of high, middle, and low). The "encryption scheme" may include, for example, RC4 as a stream cipher and 3DES, AES, and RSA as block ciphers. Block cipher modes may include, for example, ECB, CBC, CFB, OFB, and CTR.

FIG. 5B illustrates an example of the data structure of second policy information 76b. The second policy information 76b is formed of a data table indicating the correspondences among device types, data types, and security levels.

The "device type" is a category of a device, and a device is classified in accordance with predetermined categories regarding, for example, the application, the function, the general name, or the product name. For example, each IoT device 18 may be classified in accordance with (1) "large categories", including a computer device, an office device, and a lighting device, (2) "medium categories", including a copier, a smartphone, a wearable terminal, and the name of a manufacturer, or (3) "small categories", including a model number of the product, a series, and version information of installed software. The "data type" is a category of the meaning or content of data, and data is classified in accordance with predetermined categories regarding, for example, the application or function. "Interaction" data is data representing the interaction between users and may include, for example, audio and video data and text data. "Biological" data is data representing a state of a living body including a human and may include, for example, pulse, body temperature, and blood pressure. "Position" data is data representing the location of the IoT device 18 and may include, for example, position information calculated by using a signal obtained from a positioning satellite. "Device operation" data is data representing an operation or state of the IoT device 18 and may include, for example, measurement data and a self-diagnosis result (error code). "System operation" data is data representing an operation state of the system including the image forming apparatus 14 and may include, for example, billing information, consumables information, and job log information.

Assuming a case where it is not possible to cover all types of IoT devices 18 that may be targets from which data is to be collected, the "device type" may include "others" that do not belong to any of the types classified in advance. Likewise, assuming a case where it is not possible to cover all types of collected data, the "data type" may include "others" that do not belong to any of the types classified in advance.
Electrical Block Diagram of Central Server 12

Figure 6:
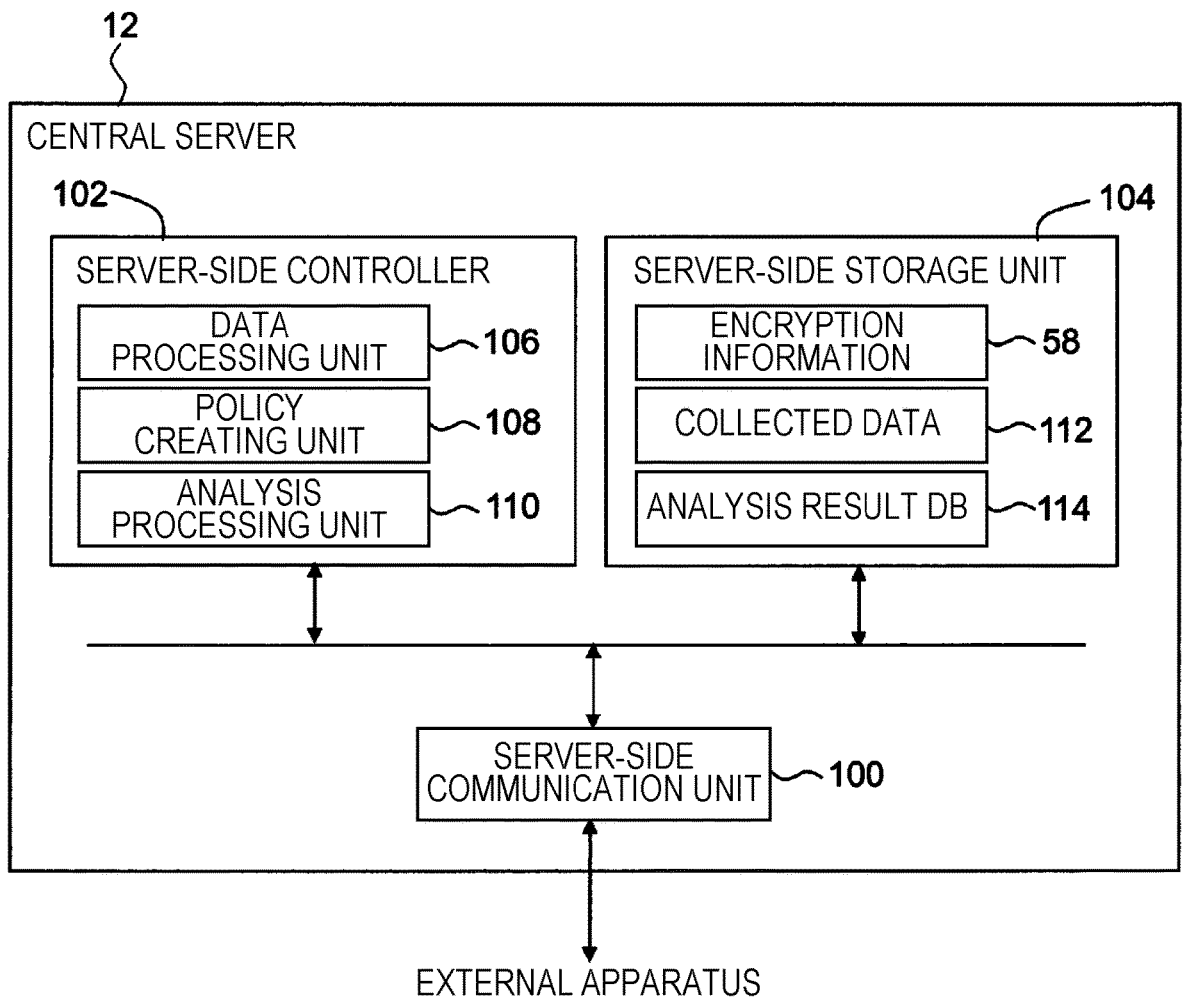
FIG. 6 is an electrical block diagram of a central server illustrated in FIG. 1.

FIG. 6 is an electrical block diagram of the central server 12 illustrated in FIG. 1. The central server 12 includes a server-side communication unit 100, a server-side controller 102, and a server-side storage unit 104.

The server-side communication unit 100 is a communication interface for transmitting/receiving an electric signal to/from an external apparatus. Accordingly, the central server 12 is capable of transmitting/receiving various data (for example, the encryption information 58 and encrypted data D4) to/from the image forming apparatus 14 through the network 22.

The server-side controller 102 is formed of an arithmetic processing device including a CPU and an MPU. The server-side controller 102 reads a program stored in the server-side storage unit 104 and executes the program, thereby functioning as a data processing unit 106 that encrypts/decrypts data, a policy creating unit 108 that creates the encryption policy 76, and an analysis processing unit 110 that performs detailed analysis of data.

The server-side storage unit 104 is formed of a non-transitory computer readable storage medium. In the example illustrated in FIG. 6, the server-side storage unit 104 stores the encryption information 58, which is shared with the image forming apparatus 14, and collected data 112 obtained from the image forming apparatus 14. In addition, the server-side storage unit 104 has a database about a data analysis result (hereinafter an analysis result DB 114).
First Operation of Data Collecting System 10

Figure 7A:
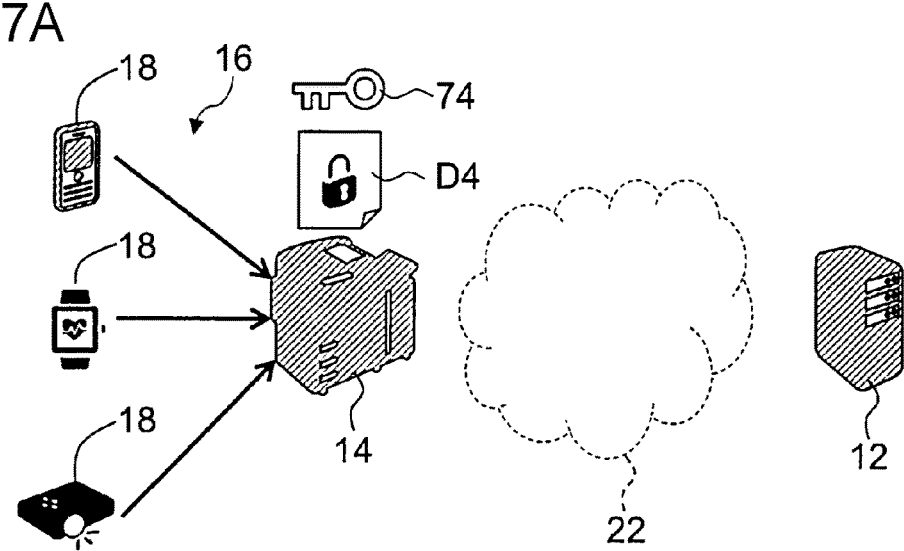
FIGS. 7A to 7C schematically illustrate the cooperation among a device group, the image forming apparatus, and the central server during a first operation of the data collecting system.
Figure 7B:
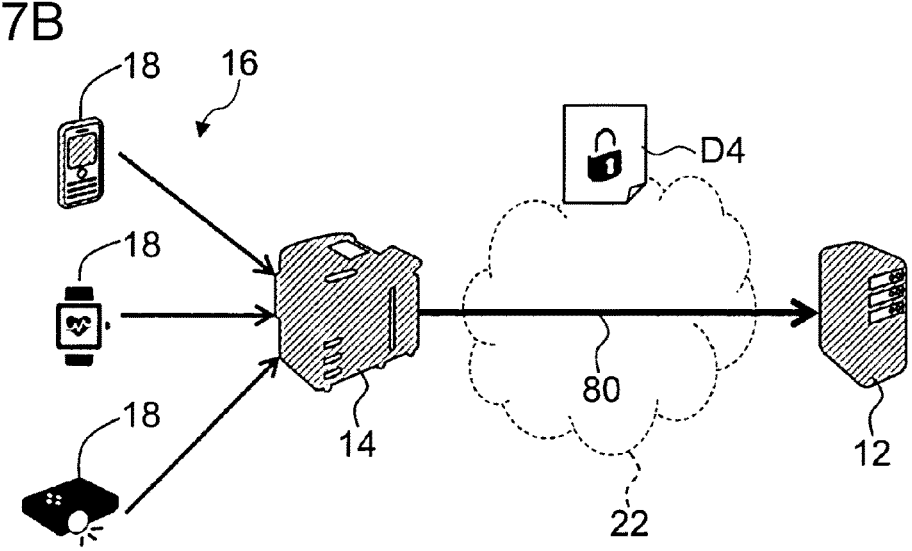
Figure 7C:
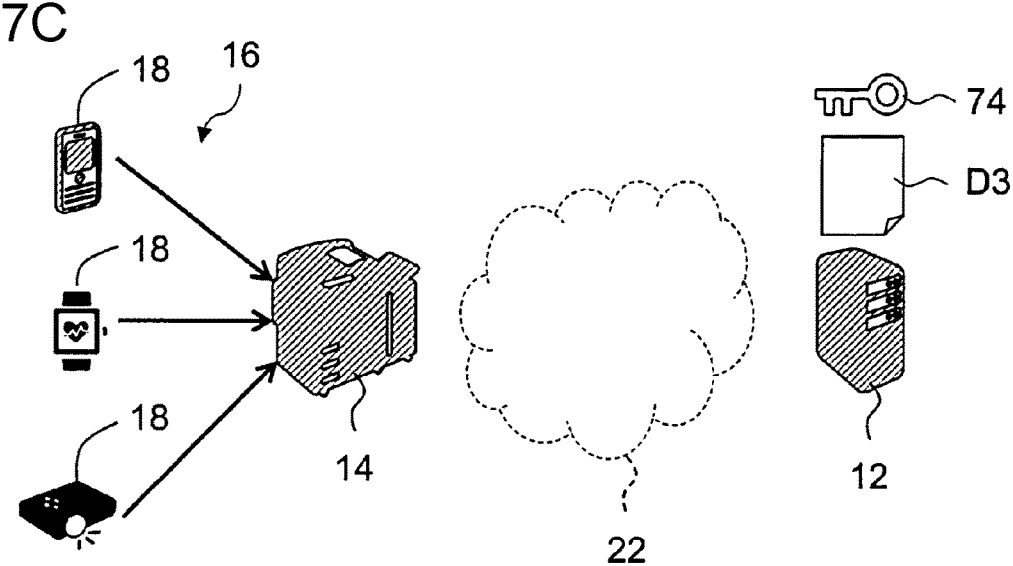

The data collecting system 10 according to the exemplary embodiment has the above-described configuration. Next, operations of the data collecting system 10, including a first operation, a second operation, and a third operation, will be described.
Outline of First Operation FIGS. 7A to 7C schematically illustrate the cooperation among the device group 16, the image forming apparatus 14, and the central server 12 during the first operation of the data collecting system 10. Here, the "first operation" means a series of operations for providing data generated by the device group 16 to the central server 12.

In FIG. 7A, the image forming apparatus 14 regularly or irregularly collects the data generated by the device group 16 and temporarily stores the data. Subsequently, the image forming apparatus 14 encrypts the data at an appropriate time by using the encryption key 74 that is shared with the central server 12, thereby obtaining the encrypted data D4.

In FIG. 7B, after establishing a connection to the central server 12, the image forming apparatus 14 transmits the encrypted data D4 generated by the image forming apparatus 14 to the central server 12. Accordingly, the central server 12 receives the encrypted data D4 through an unencrypted communication path 80 on the network 22.

In FIG. 7C, the central server 12 decrypts the encrypted data D4 by using the encryption key 74 that is shared with the image forming apparatus 14, thereby converting the encrypted data D4 into the provided data D3. Hereinafter, the first operation for realizing the transmission and reception of data, performed by the image forming apparatus 14 and the central server 12, will be described in detail mainly with reference to the flowchart in FIG. 8.

Flowchart of First Operation

Figure 8:
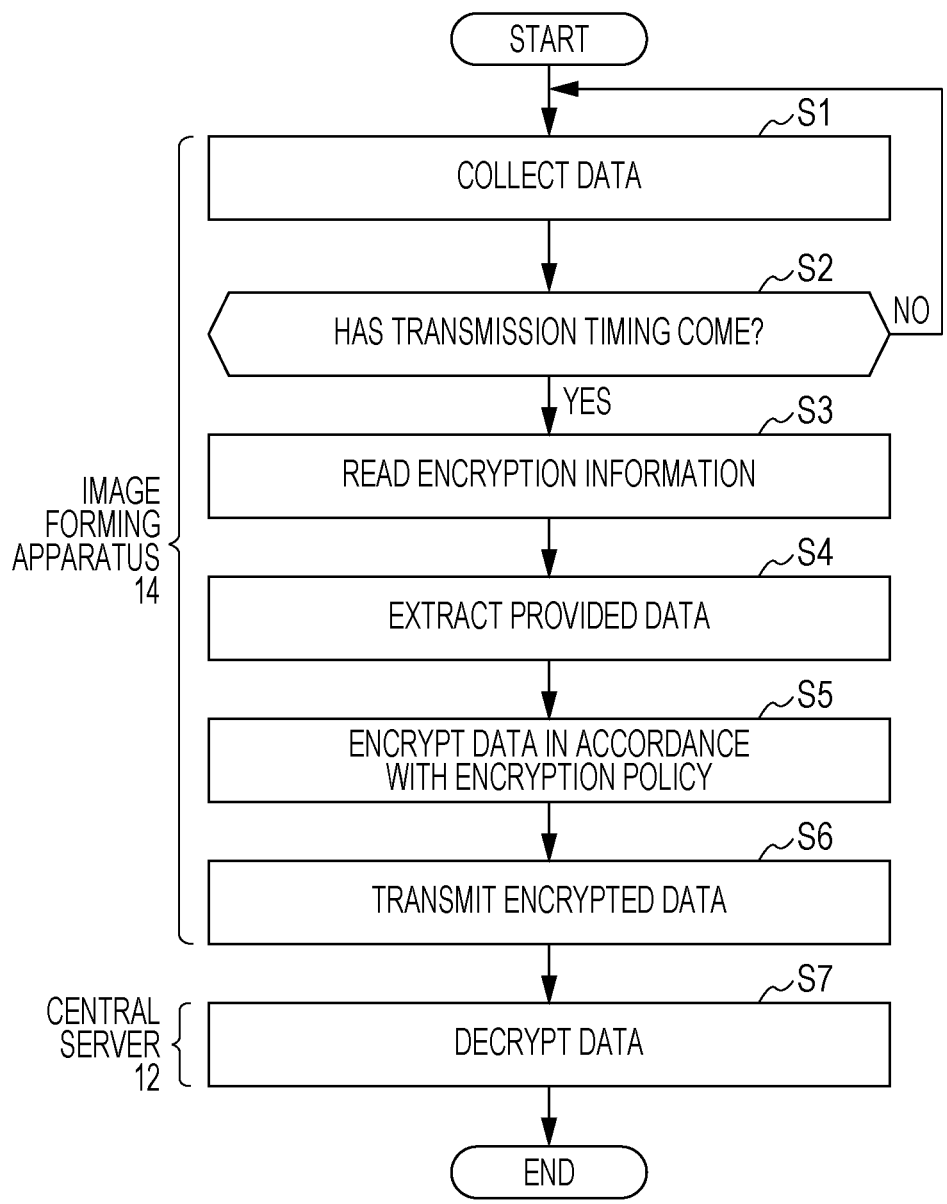
FIG. 8 is a flowchart of the first operation.

In step S1 in FIG. 8, the data collecting unit 60 collects data from the device group 16 formed of one or plural IoT devices 18 and causes the storage device 42 to store the obtained data. Accordingly, the data group 56 as an aggregation of data pieces is sequentially updated.

In step S2, the output processing unit 64 determines whether or not a transmission timing for transmitting the data group 56 collected in step S1 has come. If the transmission timing has not yet come (NO in step S2), the processing returns to step S1, and the data collection operation is continued until the transmission timing comes. On the other hand, if the transmission timing has come (YES in step S2), the processing proceeds to step S3.

In step S3, the output processing unit 64 reads and obtains the encryption information 58 stored in the storage device 42, that is, the encryption key 74 and the encryption policy 76. The encryption information 58 may be provided online by the central server 12 or may be provided offline through an operation by a manager.

For example, in the case of providing the encryption information 58 online, the central server 12 may transmit the encryption key 74, which is used to encrypt data, and the encryption policy 76 to the image forming apparatus 14 by using an encrypted communication path. This enables the image forming apparatus 14 to receive both the encryption key 74 and the encryption policy 76 associated with each other, and thus the encryption information 58, which is necessary for encryption processing, is managed more appropriately than in the case of separately transmitting the encryption key 74 and the encryption policy 76.

In step S4, the output processing unit 64 extracts data to be transmitted (that is, the provided data D3) from the data group 56. Subsequently, the output processing unit 64 classifies the provided data D3 in accordance with the categories of "device type" or "data type" defined by the second policy information 76b (see FIG. 5B). These categories are defined such that the data can be specified by the format of the data (for example, the data size or file extension) or the identification information included in the data (for example, a character string or flag), to reduce the amount of computation in classification processing.

In step S5, the output processing unit 64 (more specifically, the encryption processing unit 70) encrypts the provided data D3 extracted in step S4 in accordance with the encryption policy 76 obtained in step S3. Prior to the encryption, the encryption processing unit 70 combines the two types of tables constituting the encryption policy 76 and then associates the combination of "device type" and "data type" with "encryption scheme". In the example illustrated in FIGS. 5A and 5B, the combination of "model A" and "interaction" is associated with "AES256".

Subsequently, the encryption processing unit 70 aggregates pieces of the provided data D3 in units of execution of encryption processing and encrypts the pieces of data by using a corresponding encryption scheme. Hereinafter, a method for aggregating pieces of the provided data D3 will be described by using five specific examples.

In a first example, the encryption processing unit 70 may aggregate data pieces of the same data type in the provided data D3 obtained from the device group 16 and may collectively encrypt the data pieces by using a corresponding encryption scheme.

In a second example, the encryption processing unit 70 may aggregate data pieces whose data types correspond to the same encryption scheme in the provided data D3 obtained from the device group 16 and may collectively encrypt the data pieces by using the same encryption scheme.

In a third example, in a case where data pieces of plural types have been collected from one IoT device 18 by the data collecting unit 60, the encryption processing unit 70 may collectively encrypt the data pieces by using an encryption scheme corresponding to the data type having the highest security level among the plural types.

In a fourth example, in a case where collected data does not belong to any of the data types classified in advance, that is, the collected data is classified as "others", the encryption processing unit 70 may encrypt the data by using an encryption scheme corresponding to the data type having the highest security level.

In a fifth example, in a case where collected data does not belong to any of the data types classified in advance, that is, the collected data is classified as "others", the encryption processing unit 70 may encrypt the data by using an encryption scheme corresponding to the data type having the lowest security level.

In step S6, the output processing unit 64 (more specifically, the transmission processing unit 72) transmits the data encrypted in step S5 (that is, the encrypted data D4) to the central server 12 via the network communication unit 48 (FIG. 3).

In the installation area Ar, the proxy server 32 (FIG. 2) that communicates with the central server 12 by acting as an intermediary for the image forming apparatus 14 may be provided. When the image forming apparatus 14 transmits data to the central server 12, if the image forming apparatus 14 requests the proxy server 32 to encrypt the data or the communication path, the processing load of the proxy server 32 may increase. In addition, there is a possibility that the proxy server 32 does not support all the encryption schemes included in the encryption policy 76 (the first policy information 76a) because of system configuration constraints.

For these reasons, when the image forming apparatus 14 transmits the encrypted data D4 to the central server 12 via the proxy server 32, it is not always necessary for the central server 12 and the proxy server 32 to perform encrypted communication (that is, encryption of the data or the communication path at the time of communication). This enables encryption between the image forming apparatus 14 and the central server 12 without causing the proxy server 32 to perform encryption processing.

In one exemplary embodiment, the encryption policy 76 includes only the types of encryption schemes available to both the image forming apparatus 14 and the central server 12. Accordingly, mismatch in encryption/decryption resulting from the combination of the image forming apparatus 14 and the central server 12 may be addressed, and operation faithfully conforming to the determined encryption policy 76 may be performed.

In step S7, the central server 12 receives the encrypted data D4 transmitted in step S6, and decrypts the data by using the encryption information 58 shared with the image forming apparatus 14. Subsequently, the central server 12 accumulates the provided data D3, which has been obtained through the decryption, as a part of the collected data 112. Accordingly, the first operation of the data collecting system 10 ends.

As described above, the image forming apparatus 14 serving as a data collecting apparatus includes the data collecting unit 60 (collecting unit) that collects data generated by the device group 16 formed of the plural IoT devices 18; and the output processing unit 64 (output processing unit) that encrypts the collected data and transmits the encrypted data D4 to the central server 12. The encryption of the collected data is performed in accordance with the encryption policy 76 that defines encryption schemes for different combinations of a device type and a data type.

According to a data collection method and program, one or plural computers execute a process including: collecting data generated by the device group 16 (S1); and encrypting the collected data (S5) and transmitting the encrypted data D4 to the central server 12 (external apparatus) (S6). The encryption of the collected data is performed in accordance with the encryption policy 76 that defines encryption schemes for different combinations of a device type and a data type.

Second Operation of Data Collecting System 10
Outline of Second Operation

Figure 9A:
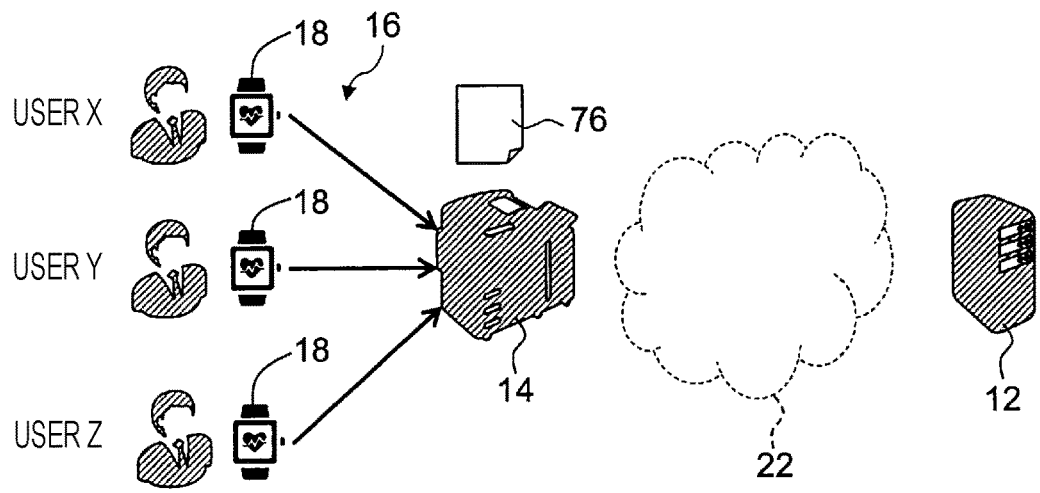
FIGS. 9A to 9C schematically illustrate the cooperation among the device group, the image forming apparatus, and the central server during a second operation of the data collecting system.
Figure 9B:
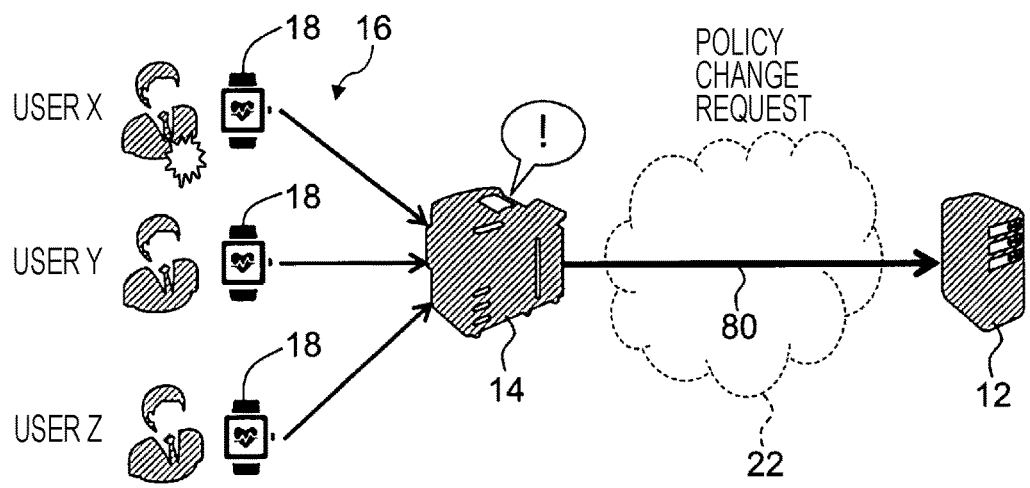
Figure 9C:
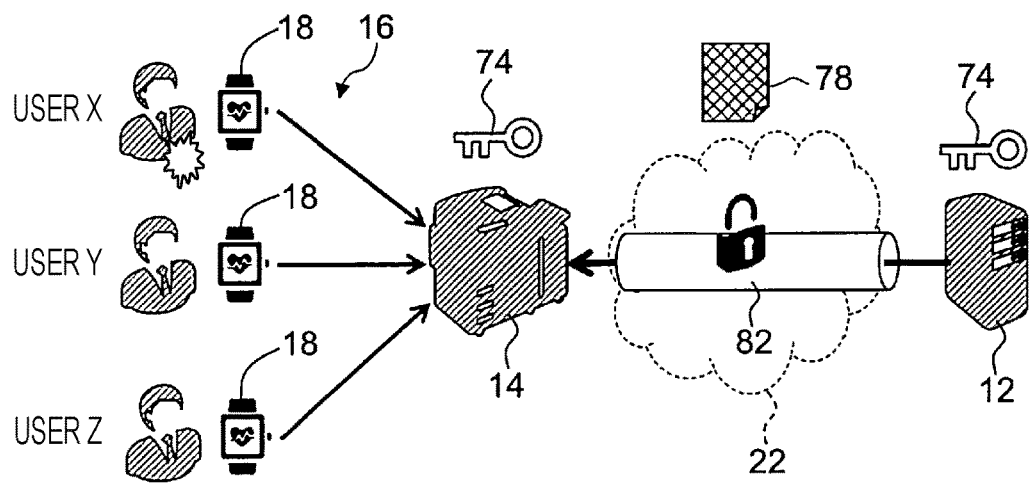

FIGS. 9A to 9C schematically illustrate the cooperation among the device group 16, the image forming apparatus 14, and the central server 12 during the second operation of the data collecting system 10. Here, the "second operation" means a series of operations for temporarily enhancing the security of a specific data type.

In FIG. 9A, the image forming apparatus 14 regularly or irregularly collects the data generated by the device group 16 and temporarily stores the data. Here, the image forming apparatus 14 encrypts the data in accordance with the encryption policy 76 for "normal times" and transmits the encrypted data.

In FIG. 9B, when detecting that biological data indicating the pulse of user X has deviated from a management range, the image forming apparatus 14 establishes a connection to the central server 12 and transmits to the central server 12 a request to change the encryption policy 76. The central server 12 receives the request from the image forming apparatus 14 through the unencrypted communication path 80 on the network 22.

In FIG. 9C, after establishing a connection to the image forming apparatus 14, the central server 12 transmits an encryption policy 78 for "enhanced security" generated by the central server 12 to the image forming apparatus 14.

The image forming apparatus 14 receives the encryption policy 78 from the central server 12 through an encrypted communication path 82 on the network 22. After that, the image forming apparatus 14 encrypts data in accordance with the encryption policy 78 and transmits the encrypted data.

Flowchart of Second Operation

Hereinafter, the second operation performed by the image forming apparatus 14 and the central server 12 for realizing the transmission and reception of data will be described in detail with reference to the flowchart in FIG. 10. Note that the image forming apparatus 14 and the central server 12 share the encryption policy 76 for "normal times" before execution of the second operation.

Figure 10:
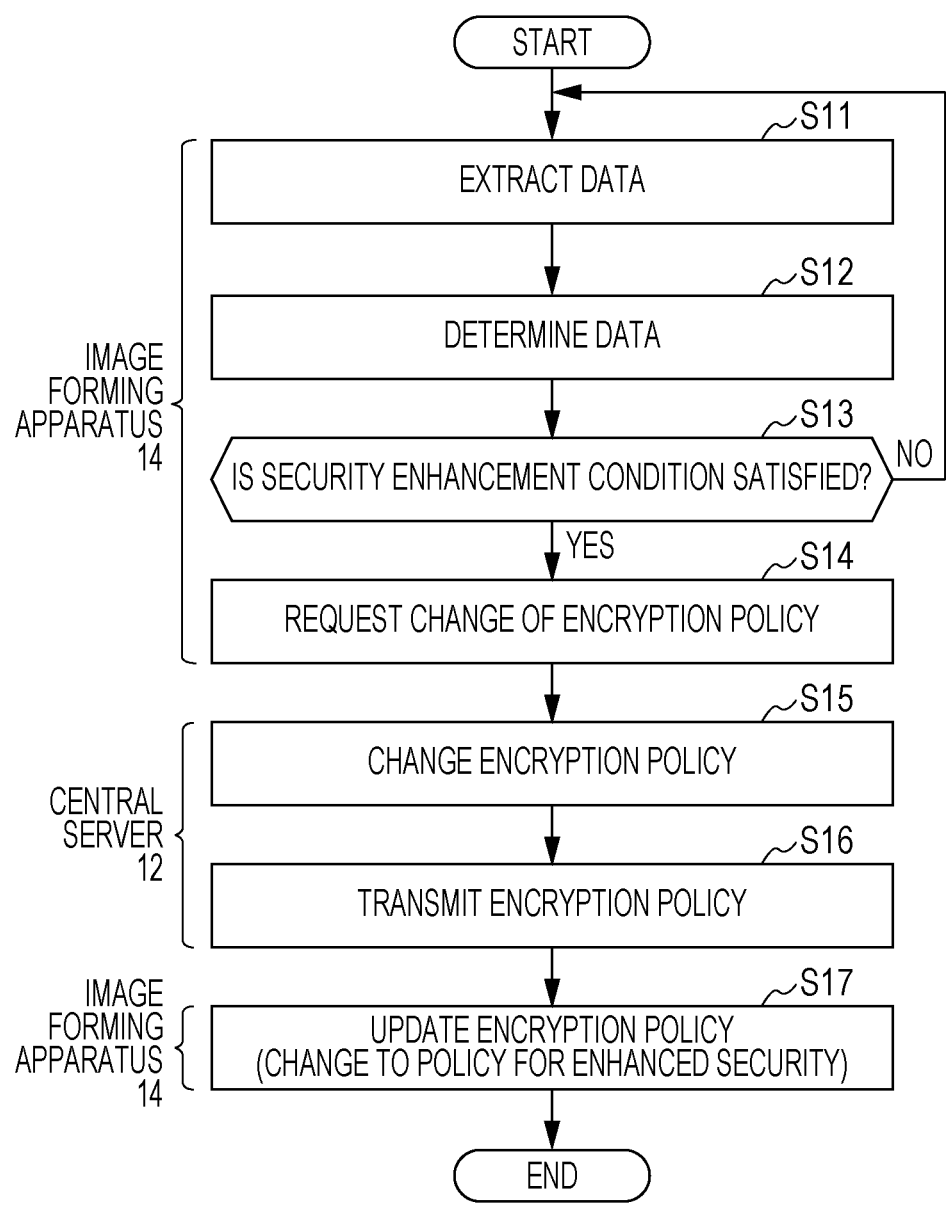
FIG. 10 is a flowchart of the second operation.

In step S11 in FIG. 10, the data processing unit 62 (more specifically, the determining unit 68) extracts data as a target to be determined from the data group 56. For example, the determining unit 68 may partially extract necessary data in accordance with the categories of "device type" or "data type" defined by the second policy information 76b as in the case of step S4 in FIG. 8.

In step S12, the determining unit 68 determines whether or not the data extracted in step S11 satisfies a predetermined first condition (hereinafter referred to as a "security enhancement condition"). Here, the "security enhancement condition" is a condition for detecting a state where the confidentiality of data about individuals or works has become relatively high. If the security enhancement condition is satisfied, it is necessary to handle specific data more carefully than usual when transmitting the data to the outside of the image forming apparatus 14.

The security enhancement condition may be a condition about the content of data or the collection status of data, and specific examples include (1) a case where the value of specific data has deviated from a management range, (2) a case where specific data includes information indicating abnormality or suspected abnormality, and (3) a case where the owner of the IoT device 18 can be specified. When it is possible to obtain time-series data, whether or not the security enhancement condition is satisfied may be determined not only once but also plural times in a consecutive manner.

Alternatively, the central server 12 may determine whether or not the security enhancement condition is satisfied, instead of the determining unit 68 of the image forming apparatus 14. However, there is a possibility that the central server 12 is incapable of swiftly coping with the enhancement of security for the reason such as a delay of start of determination by the central server 12 or incompatibility with push communication (that is, compatibility with only pull communication). Here, "pull communication" means communication in which information is distributed in response to a request from the image forming apparatus 14. Thus, it is noted that the image forming apparatus 14 determines whether or not the security enhancement condition is satisfied, in order to increase the immediacy.

In step S13, the determining unit 68 confirms the determination result obtained in step S12. If the security enhancement condition is not satisfied (NO in step S13), steps S11 and S12 are repeated. On the other hand, if the security enhancement condition is satisfied (YES in step S13), the processing proceeds to step S14.

In step S14, the output processing unit 64 (more specifically, the transmission processing unit 72) performs transmission control to request change of the current encryption policy 76 after receiving from the determining unit 68 the determination result indicating that the security is to be enhanced. Accordingly, the image forming apparatus 14 transmits a request signal to the central server 12 via the network communication unit 48 (FIG. 3).

In step S15, the central server 12 changes the encryption policy 76 in response to the request that is made in step S14. Specifically, the server-side controller 102 (more specifically, the policy creating unit 108) rewrites part of the second policy information 76b to generate the encryption policy 78 for "enhanced security".

FIGS. 11A to 11C illustrate a first change example of the encryption policy 76. In the example illustrated in FIGS. 11A to 11C, the IoT devices 18 are multifunction watches (so-called smart watches) wearable by users and each include a vital sensor that measures biological information of the user.

As illustrated in FIG. 11A, it is assumed that the image forming apparatus 14 sequentially collects biological data of three users X, Y, and Z from the device group 16. For example, if the physical condition of user X deteriorates and the pulse (the number of heartbeats per unit time) of user X deviates from a management range, as illustrated in FIG. 11B, second policy information 78b illustrated in FIG. 11C is created.

The second policy information 78b is identical to the second policy information 76b illustrated in FIG. 5B except that the security level of the data type "biological" is "high". That is, as a result of changing the security level of "biological" from "middle" to "high", the security in transmitting biological data is enhanced.

FIGS. 12A to 12C illustrate a second change example of the encryption policy 76. In the example illustrated in FIGS. 12A to 12C, the IoT devices 18 are mobile terminals (for example, smartphones) portable by users and each include a positioning sensor that measures the position of the user.

As illustrated in FIG. 12A, it is assumed that the image forming apparatus 14 sequentially collects personal data of three users X, Y, and Z from the device group 16. For example, if two users Y and Z have gone away and only user X is present, as illustrated in FIG. 12B, second policy information 78b illustrated in FIG. 12C is created.

The second policy information 78b is identical to the second policy information 76b illustrated in FIG. 5B except that the security level of the data type "position" is "high". That is, as a result of changing the security level of "position" from "middle" to "high", the security in transmitting position data is enhanced. Although "position" is described as an example here, another data type having an aspect of personal information, such as "biological", may be used.

In step S16 in FIG. 10, the central server 12 (more specifically, the server-side controller 102) transmits the encryption policy 78 created in step S15 to the image forming apparatus 14 via the server-side communication unit 100 (FIG. 6). Specifically, the central server 12 establishes a connection to the image forming apparatus 14 (or the proxy server 32) and then transmits the encryption policy 78 by using the encrypted communication path 82.

In step S17, after receiving the encryption policy 78 transmitted in step S16, the image forming apparatus 14 stores the encryption policy 78 in the storage device 42 by replacing the encryption policy 76 for "normal times" with the encryption policy 78. After that, the image forming apparatus 14 encrypts data in accordance with the encryption policy 78 for "enhanced security" and transmits the encrypted data. Accordingly, the second operation of the data collecting system 10 ends.

As described above, the image forming apparatus 14 serving as an edge server may include the determining unit 68 (determining unit) that determines, based on the content of data or the collection status of data, whether or not to change the encryption policy 76 ("enhance" the security in the second operation).

The transmission processing unit 72 (output processing unit) may request the central server 12 to change the encryption policy 76 in accordance with the determination result obtained by the determining unit 68, and the central server 12, which is a server that performs pull communication with the image forming apparatus 14, may transmit to the image forming apparatus 14 the encryption policy 78 that has been changed in response to the request from the image forming apparatus 14.

The determining unit 68 may determine whether or not the value of measurement data obtained through measurement by the IoT device 18 has deviated from a predetermined management range. If it is determined that the value has deviated from the management range, the transmission processing unit 72 may request change of the encryption policy 76 so that the security level of the measurement data becomes higher than a current level.

In one exemplary embodiment, the above-described measurement data is biological data obtained through measurement on the user wearing the IoT device 18.

The determining unit 68 may determine whether or not the number of mobile devices portable by users and capable of accessing the image forming apparatus 14 has become smaller than a threshold value. If it is determined that the number of mobile devices has become smaller than the threshold value, the transmission processing unit 72 may request change of the encryption policy 76 so that the security level of data generated by the mobile devices becomes higher than a current level.

Third Operation of Data Collecting System 10
Outline of Third Operation

Figure 13A:
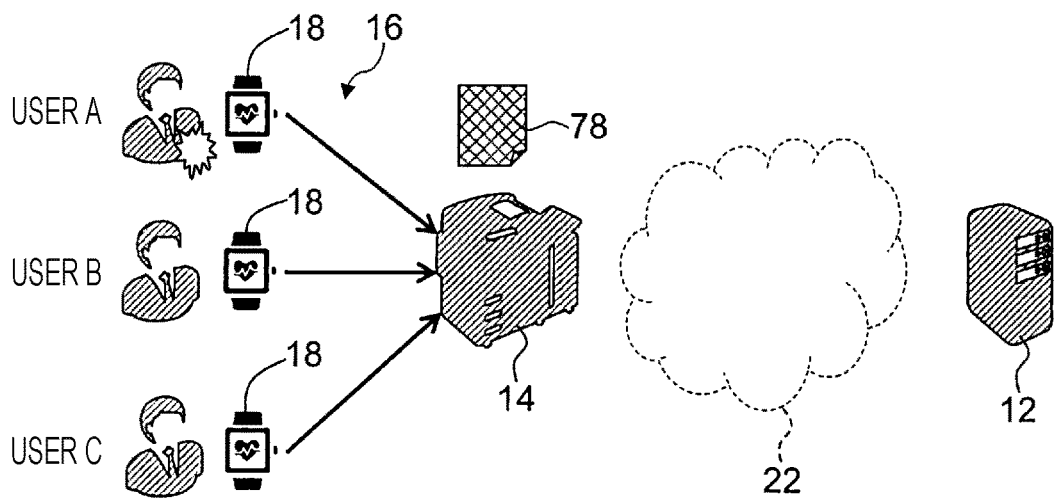
FIGS. 13A to 13C schematically illustrate the cooperation among the device group, the image forming apparatus, and the central server during a third operation of the data collecting system.
Figure 13B:
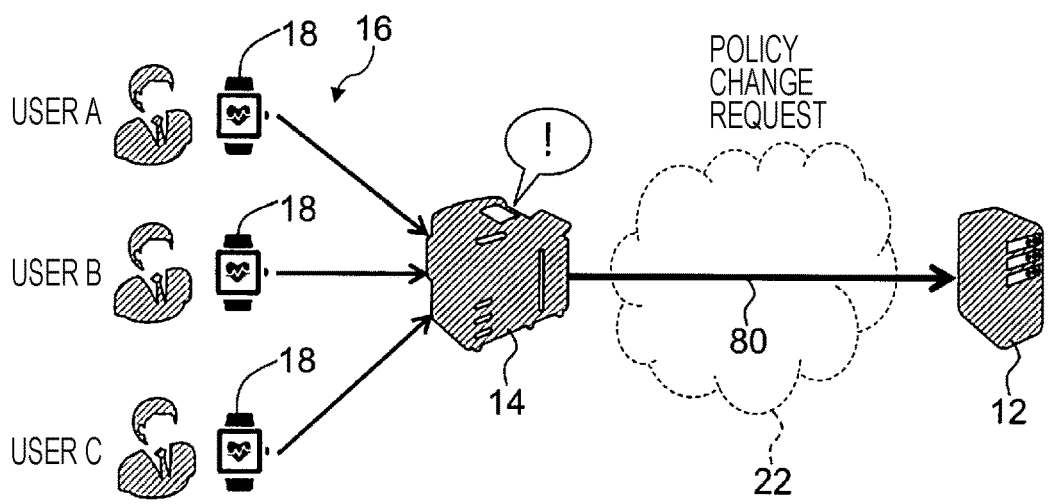
Figure 13C:
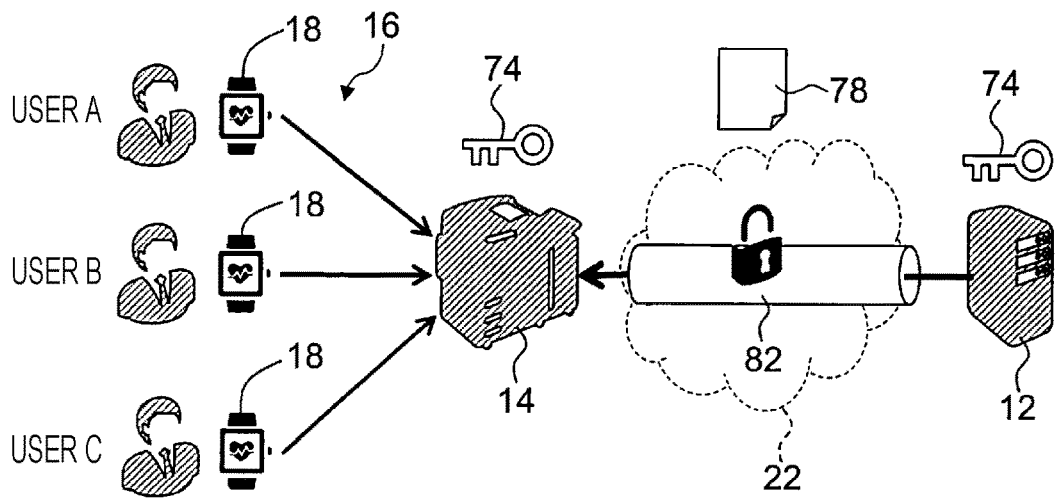

FIGS. 13A to 13C schematically illustrate the cooperation among the device group 16, the image forming apparatus 14, and the central server 12 during the third operation of the data collecting system 10. Here, the "third operation" means a series of operations for cancelling the security enhancement in a specific data type.

In FIG. 13A, the image forming apparatus 14 regularly or irregularly collects the data generated by the device group 16 and temporarily stores the data. Here, the image forming apparatus 14 encrypts data in accordance with the encryption policy 78 for "enhanced security" and transmits the encrypted data.

In FIG. 13B, when detecting that the biological data indicating the pulse of user X has returned to within the management range, the image forming apparatus 14 establishes a connection to the central server 12 and transmits to the central server 12 a request to change the encryption policy 78. The central server 12 receives the request from the image forming apparatus 14 through the unencrypted communication path 80 on the network 22.

In FIG. 13C, after establishing a connection to the image forming apparatus 14, the central server 12 transmits the encryption policy 76 for "normal time" generated by the central server 12 to the image forming apparatus 14. The image forming apparatus 14 receives the encryption policy 76 from the central server 12 through the encrypted communication path 82 on the network 22.

Flowchart of Third Operation

Hereinafter, the third operation performed by the image forming apparatus 14 and the central server 12 for realizing the transmission and reception of data will be described in detail with reference to the flowchart in FIG. 14. Note that the image forming apparatus 14 and the central server 12 share the encryption policy 78 for "enhanced security" before execution of the third operation.

Figure 14:
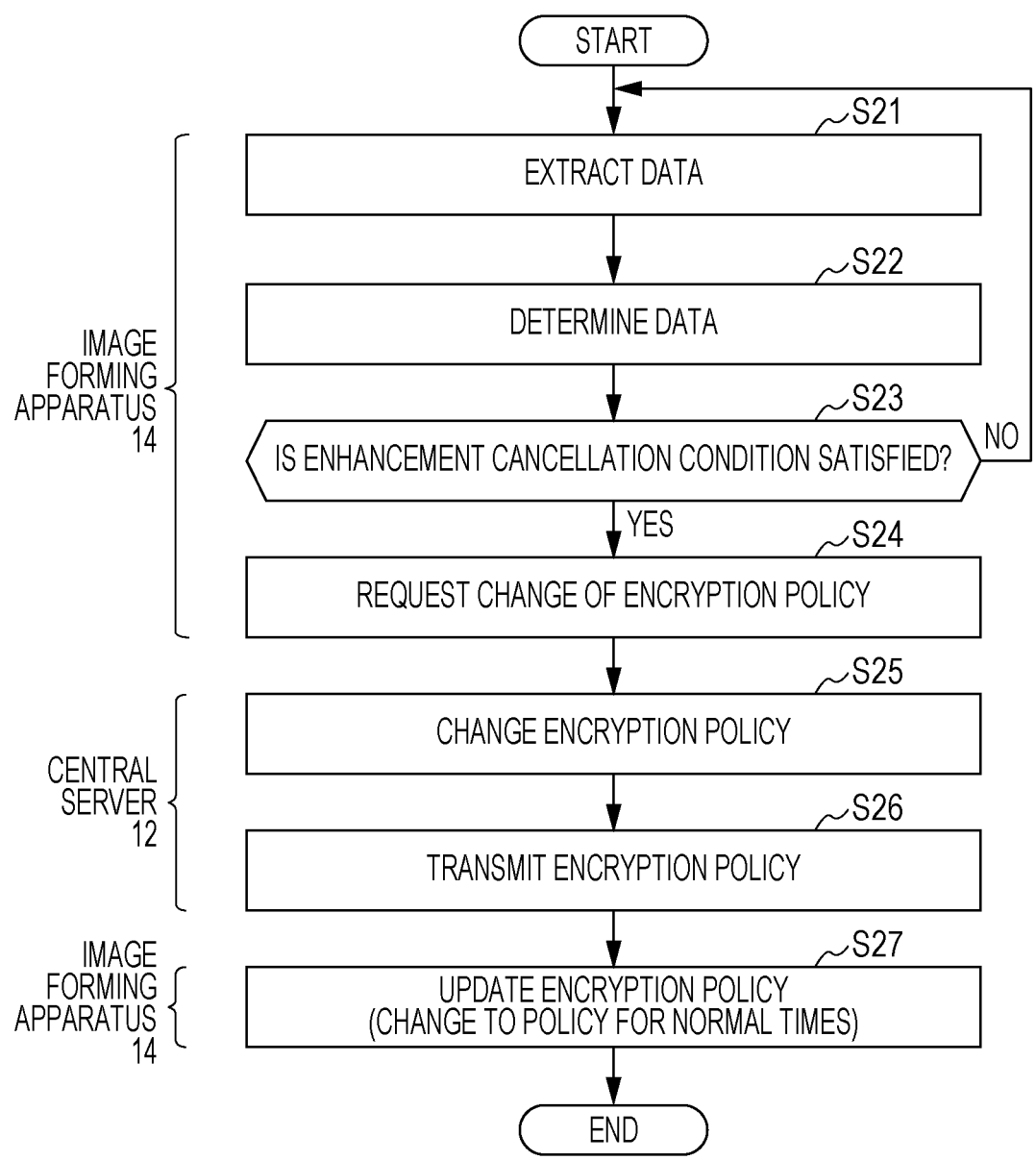
FIG. 14 is a flowchart of the third operation.

In step S21 in FIG. 14, the data processing unit 62 (more specifically, the determining unit 68) extracts data as a target to be determined from the data group 56. This operation is similar to that in step S11 (FIG. 10) in the second operation, and thus the detailed description thereof will not be given.

In step S22, the determining unit 68 determines whether or not the data extracted in step S21 satisfies a predetermined second condition (hereinafter referred to as an "enhancement cancellation condition"). Here, the "enhancement cancellation condition" is a condition for detecting a state where the confidentiality of data about individuals or works has become relatively low, and is a condition about the content of data or the collection status of data.

Specific examples of the enhancement cancellation condition include (1) a case where the value of specific data has returned within the management range, (2) a case where specific data includes information indicating normality, and (3) a case where it is impossible to specify the owner of the IoT device 18. When it is possible to obtain time-series data, whether or not the enhancement cancellation condition is satisfied may be determined not only once but also plural times in a consecutive manner. The enhancement cancellation condition may be the complementary event (complement) of the above-described security enhancement condition or may be a condition difference from the complementary event.

In step S23, the determining unit 68 confirms the determination result obtained in step S22. If the enhancement cancellation condition is not satisfied (NO in step S23), steps S21 and S22 are repeated. On the other hand, if the enhancement cancellation condition is satisfied (YES in step S23), the processing proceeds to step S24.

In step S24, the output processing unit 64 (more specifically, the transmission processing unit 72) performs transmission control to request change of the current encryption policy 78 after receiving from the determining unit 68 the determination result indicating that the security enhancement is to be cancelled. Accordingly, the image forming apparatus 14 transmits a request signal to the central server 12 via the network communication unit 48 (FIG. 3).

In step S25, the central server 12 changes the encryption policy 78 in response to the request that is made in step S24. Specifically, the server-side controller 102 (more specifically, the policy creating unit 108) rewrites part of the second policy information 78b to generate the encryption policy 76 for "normal times".

In step S26, the central server 12 (more specifically, the server-side controller 102) transmits the encryption policy 76 created in step S25 to the image forming apparatus 14 via the server-side communication unit 100 (FIG. 6). Specifically, the central server 12 establishes a connection to the image forming apparatus 14 (or the proxy server 32) and then transmits the encryption policy 76 by using the encrypted communication path 82.

In step S27, after receiving the encryption policy 76 transmitted in step S26, the image forming apparatus 14 stores the encryption policy 76 in the storage device 42 by replacing the encryption policy 78 for "enhanced security" with the encryption policy 76. After that, the image forming apparatus 14 encrypts data in accordance with the encryption policy 76 for "normal times" and transmits the encrypted data. Accordingly, the third operation of the data collecting system 10 ends.

As described above, the image forming apparatus 14 serving as an edge server may include the determining unit 68 that determines, based on the content of data or the collection status of data, whether or not to change the encryption policy 78 ("degrade" the security in the third operation).

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A data collecting system comprising:
   a central server; and
   at least one edge server capable of bi-directionally communicating with the central server,
   the edge server including
   a hardware processor that collects data generated by a group of devices, and
   a hardware image forming apparatus that encrypts the collected data and transmits the encrypted data to the central server,
   wherein the encryption of the collected data is performed in accordance with an encryption policy that defines encryption schemes for different combinations of a device type and a data type,
   wherein in a case where data pieces of different types have been collected from a device by the data collection by the hardware processor, the hardware image forming apparatus collectively encrypts the data pieces by using an encryption scheme corresponding to the highest security level required by any of the different data types.

2. The data collecting system according to claim 1, wherein when the edge server transmits the encrypted data to the central server via a proxy server, the central server does not perform encrypted communication with the proxy server.

3. The data collecting system according to claim 1, wherein the central server transmits, to the edge server through an encrypted communication path, the encryption policy and an encryption key that is to be used to encrypt data.

4. The data collecting system according to claim 1, wherein the hardware image forming apparatus aggregates data pieces whose data types correspond to the same encryption scheme, and collectively encrypts the data pieces.

5. The data collecting system according to claim 1, wherein the hardware image forming apparatus encrypts data pieces that do not belong to any data types defined in the encryption policy by using an encryption scheme corresponding to the highest security level defined in the encryption policy.

6. The data collecting system according to claim 1, wherein the hardware image forming apparatus encrypts data pieces that do not belong to any data types defined in the encryption policy by using an encryption scheme corresponding to the lowest security level defined in the encryption policy.

7. The data collecting system according to claim 1, wherein the edge server further includes a hardware server-side controller that determines, based on content of the data or a collection status of the data, whether or not to change the encryption policy.

8. The data collecting system according to claim 7, wherein
   the hardware image forming apparatus makes a request of the central server to change the encryption policy in accordance with a determination result obtained by the hardware server-side controller, and
   the central server is a server that performs pull communication with the edge server, and transmits to the edge server the encryption policy that has been changed in response to the request from the edge server.

9. The data collecting system according to claim 8, wherein
   the hardware server-side controller determines whether or not each of values of measurement data obtained through measurements by the devices has deviated from a predetermined management range, and when a determination is made that at least one of the values has deviated from the management range, the hardware image forming apparatus makes a request of the central server to change the encryption policy so that a security level of the measurement data increases from a current level.

10. The data collecting system according to claim 9, wherein the measurement data is biological data that is obtained through measurements performed on users each wearing one of the devices.

11. The data collecting system according to claim 8, wherein
the hardware server-side controller determines whether or not a number of portable devices that are capable of accessing the edge server has become smaller than a threshold value, and
when a determination is made that the number has become smaller than the threshold value, the hardware image forming apparatus makes a request of the central server to change the encryption policy so that data generated by the portable devices has a security level higher than a current level.

12. A data collecting apparatus comprising:
a hardware processor that collects data generated by a group of devices, and
a hardware image forming apparatus that encrypts the collected data and transmits the encrypted data to an external apparatus,
wherein the encryption of the collected data is performed in accordance with an encryption policy that defines encryption schemes for different combinations of a device type and a data type,
wherein in a case where data pieces of different types have been collected from a device by the data collection by the hardware processor, the hardware image forming apparatus collectively encrypts the data pieces by using an encryption scheme corresponding to the highest security level required by any of the different data types.

13. A non-transitory computer readable medium storing a program causing a computer to execute a process for data collection, the process comprising:
collecting data generated by a group of devices, and
encrypting the collected data and transmitting the encrypted data to an external apparatus,
wherein the encryption of the collected data is performed in accordance with an encryption policy that defines encryption schemes for different combinations of a device type and a data type,
wherein in a case where data pieces of different types have been collected from a device by the data collection by the hardware processor, the hardware image forming apparatus collectively encrypts the data pieces by using an encryption scheme corresponding to the highest security level required by any of the different data types.

* * * * *